June 21, 1955  F. K. H. NALLINGER  2,711,159
PISTON AND PISTON TYPE INTERNAL COMBUSTION ENGINE
Filed Jan. 13, 1950
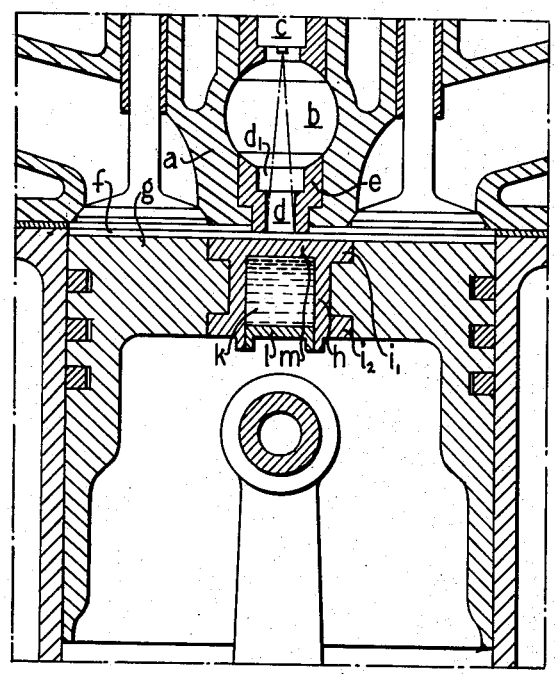
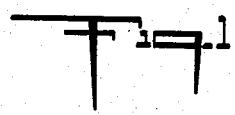
Fig.1
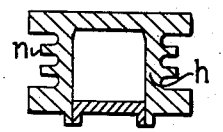 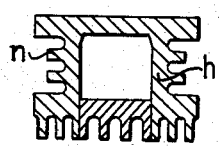 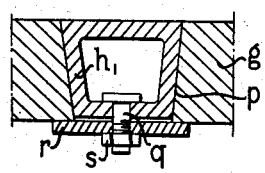
 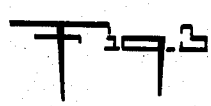 
Fig.2  Fig.3  Fig.4
INVENTOR
FRIEDRICH K. H. NALLINGER
BY Haseltine Lake & Co.,
AGENTS

United States Patent Office 2,711,159
Patented June 21, 1955

2,711,159

PISTON AND PISTON TYPE INTERNAL COMBUSTION ENGINE

Friedrich K. H. Nallinger, Stuttgart, Germany, assignor to Daimler-Benz Aktiengesellschaft, Stuttgart-Unterturkheim, Germany Application January 13, 1950, Serial No. 138,280
In Germany November 25, 1948

Public Law 619, August 23, 1954
Patent expires November 25, 1968

11 Claims. (Cl. 123—32)

The invention relates to a piston, and more particularly to such a one which is exposed to a thermally high and unequal load, and furthermore to a piston type internal combustion engine which is provided with a combustion chamber having restricted communication with the cylinder space, for instance, a pre-combustion or turbulence chamber, air chamber (called in the following as a pre-combustion chamber).

In engines of these types, the fuel, as a rule, is wholly or partially introduced into and ignited in the pre-combustion chamber, and then it is forced, in burning condition, through a narrow passage into the main combustion chamber. At the spot where the burning fuel spray strikes the piston, a relatively large amount of heat is absorbed by the piston head. This heat cannot pass along sufficiently quick enough, therefore substantially higher temperatures arise at this spot than at the other sections of the piston head. These differences in temperature cause heat stresses which on their part tend to form cracks and thereby endanger the piston.

An essential feature of the invention has the office of doing away with these objectionable features, and it consists essentially therein that the piston, particularly at the spot of greatest heat absorption, hence generally within the sphere of the spot where the burning spray strikes upon the piston crown, contains a transmission agent possessing good heat conductivity which serves as heat-exchanger. A fluid metal, by way of example, such as mercury or sodium, or a metallic salt is employed as heat-transmission agent. Depending on the circumstances, a gas, which at operating temperature is in a critical pressure stage, may also be employed.

As container for the fluid, or gaseous heat-transmission agent serves, for example, a hollow body which is either cast, forged or pressed undetachable into the piston head, or detachably connected with the latter by subsequent mechanical fastening.

By the invention it is achieved that the temperature peak, which in the hitherto usual piston arose at the spot of greatest heat absorption, is substantially subsided by quickly passing the heat along to the sphere of the piston, or also by passing it outwards, for example, to the air within the engine. Thus, by means of the heat compensation obtained hereby, the heat stresses can be reduced to such an extent that cracks in the piston crown are eliminated.

In order to accelerate the heat dissipation and for further enhancing the heat compensating effect of the heat-transmission agent, the hollow body may be provided with ribs, or with parts acting like ribs, by means of which the effective sphere of accelerated heat flow respectively the heat-transmitting surface of the hollow body is increased.

A further feature of the invention consists therein that the connecting passage, between prechamber and cylinder space being arranged in the direction of the fuel spray, is provided with an enlargement at its junction into the prechamber. This enlargement is sharply stepped down particularly towards the passage. The arrangement being particularly such a one that the section of the connecting passage not enlarged, is merely of such a length as is requisite for guiding the air which streams into the prechamber, in order to obtain a most compact air stream in the prechamber. In that way, loss of heat and frictional loss of the instreaming compressed air are diminished. The prechamber is appropriately developed to be spherical in shape, and, at the most, directly cooled at those outermost sections of its perimeter which are fartherest away from the axis of the fuel spray. As a necessary result of the above, especially in connection with the connecting passage directed against the piston crown and arranged in axial direction of the injected fuel spray, an engine is obtained which is distinguished by low fuel consumption, high efficiency and good combustion, at all engine speeds. The conjoint arrangement of a heat-dissipating insert respectively heat-transmission agent at the particular spot of the piston crown which is especially exposed to high heat stresses, provides the assurance that the piston can irreproachably withstand the heat stresses which are especially high in these types of engines.

The accompanying drawing illustrates several embodiments of the invention, and so is shown in:

Fig. 1 a cross-section through the engine with prechamber and through the preferred form of the piston in accordance with the invention, and Figs. 2 through 4 are further examples of other embodiments of the insert in the piston.

In the embodiment according to Fig. 1, a prechamber $b$ is arranged in the water cooled cylinder head $a$, for example, next to the inlet and outlet valves. By means of an injection nozzle $c$, the fuel is injected into this prechamber which is in restricted communication with the main combustion chamber $f$ via a throttling passage $d$ in an insert $e$.

The throttling or connecting passage $d$ is in this instant arranged in the direction of the injection nozzle $c$ in an essentially vertical direction towards the piston crown and being provided, on the prechamber side, with an enlargement $d_1$ which is sharply stepped down against the lower, cylindrical part of the passage.

An insert or hollow body $h$, in accordance with the invention, is inserted below the prechamber junction into the piston head $g$ being, for example, built with a thick wall. This hollow body is, for instance cast in and it is, for example, provided with flanges $i_1$ and $i_2$.

The material of the hollow body (for example, high-grade steel, or a high-grade aluminum alloy) is suitably chosen to possess the same heat-expansion qualities as the surrounding material of the piston. The interior $k$ of the hollow body $h$ is filled up or—more suitable for the object in view—only partly filled with a metal such as mercury or sodium being, for instance, fluid at operating temperature, and then it is sealed downwardly by means of a closure $l$. Sealing engagement of the closure may be obtained by pressing, welding, or by some other suitable means.

The amount of heat absorbed by the insert top $m$, exposed directly to the fuel spray issuing from the prechamber, is passed along, via the shortest route, to the transmission agent filling the cavity $k$, or being active in the same. Due to the good heat conductivity of the latter, the heat is quickly passed along and dissipated to its surroundings, that is, via the walls of the insert $h$ to the other sections of the piston head respectively via the closure $l$ to the air which, coming from the crankcase space, sweeps the under side of the piston top. As a necessary result of this, sharp temperature peaks in the piston top are eliminated, and preclude dangerous heat stresses which are caused by the same. This effect, particularly in the case when the hollow space is partially filled with the transmission agent, is, above all, further improved by the fact that the fluid or the metallic vapors resulting therefrom, or metallic salt vapors are thrown, or agitated to and fro with great force, thereby accelerating the transfer of heat. Furthermore, in order to enhance the heat dissipation, a separate cooling means, for example, a coolant may be sprayed against the under side of the piston top.

In the instant of an eccentrically arranged prechamber respectively connecting passage, it is suitable to arrange the insert also eccentrically to the axis of the cylinder, so that the fuel stream, issuing from the prechamber, strikes the insert top $m$ about centrally. However, in the instant of an eccentric junction of the passage $d$ with respect to the axis of the cylinder, provision may be made for a certain eccentricity of the insert $h$ with respect to the passage $d$, for example, for the purpose of obtaining a most central location of the insert $h$ in the piston head.

During the compression stroke of the engine, the air, having been compressed in the cylinder clearance, is forced through the connecting passage $d$ into the prechamber. At the junction of the passage $d$ and the enlargement $d_1$, the entering air stream is being diffused, so that it is in contact with the wall of the insert $e$ merely for such a length of time as is necessary for guiding the air stream. The instreaming air is guided towards the injection nozzle $c$ and is detoured to create a turbulence towards the outermost sections on the perimeter of the prechamber. Among others, this particular arrangement of the prechamber provides in particular the advantage of facilitated starting of the engine, and improving the performance in the lower speeds. On the other hand, the insert $h$ with the heat-dissipating transmission agent $k$ guarantees that the engine is not overstressed thermally during operation.

In the embodiment according to Fig. 2, the insert $h$ is provided on its outside with additional ribs $n$, furthermore, in the embodiment according to Fig. 3 conjointly with ribs $o$ for passing the heat along to the air respectively to a coolant.

The embodiment according to Fig. 4 illustrates an insert $h_1$ detachably inserted into the piston top $g$. This insert, with its conical surface $p$, fits into the piston top and is securely tightened against the conical surface of the latter by means of bolt $q$, washer $r$ and nut $s$.

It will be obvious to those who are familiar with such matters that the details of construction may be varied from those shown by me and yet the essentials of the invention be retained. I therefore do not limit myself to such details.

Having described my invention, I claim:

1. In an internal combustion engine with a cylinder space and a combustion chamber having restricted communication with said cylinder space, a piston vertically reciprocating in said cylinder space in a manner exposing the piston head to the burning gases issuing from said combustion chamber, a recess in said piston head at the spot exposed to the burning gases in the direction of the restricted communication between the combustion chamber and cylinder space when the piston is at the upper dead center, a hollow insert in said recess which is at least partially filled with a fluid heat-transmission agent.

2. In an internal combustion engine having a cylinder space, a pre-combustion chamber and a restricted channel connecting the space and chamber, a piston reciprocating in the space, the piston having a crown of such shape and the connecting channel being so arranged that the piston crown is entirely outside of the pre-combustion space and channel when the piston is at the upper dead center, the channel being so directed toward the piston crown that the contents of the chamber issuing therefrom when the piston is at the upper dead center impinge upon the piston crown inside the cylinder space, a hollow space in the piston crown in the zone thereof against which the contents of the chamber impinge and extending over only a fraction of the piston diameter, and a fluid medium having good heat transmission properties contained in the hollow space.

3. In an internal combustion engine having a cylinder space, a pre-combustion chamber and a restricted channel connecting the space and chamber, a piston having a substantially flat crown reciprocating in the space, the channel opening out toward the piston crown in such a manner that the contents of the chamber issuing therefrom when the piston is at the outer dead center will impinge upon the piston crown, a hollow space in the piston crown in the zone thereof against which the contents of the chamber impinge and extending over only a fraction of the piston diameter, and a fluid medium having good heat conducting qualities contained in said hollow space.

4. An internal combustion engine, comprising, in combination: a cylinder having a substantially flat end wall, a pre-combustion chamber communicating with said cylinder through a restricted opening in said flat end wall of said cylinder, a piston arranged in said cylinder for a reciprocating motion so as to be movable between a first end position and a second end position, said piston having a substantially flat crown arranged opposite to said flat end wall of said cylinder so as to define with said cylinder a combustion chamber having a volume changing between a maximum and a minimum when said piston reaches the first and second end positions thereof, respectively, a hollow insert arranged in said piston and having a flat wall portion extending over part of said flat crown of said piston and being flush with the same, said flat wall portion of said hollow insert being arranged opposite to said restricted opening in said flat end wall of said cylinder, and a heat transmitting fluid arranged in said hollow insert of said piston whereby fuel gases leaving said pre-combustion chamber through said restricted opening in said flat end wall of said cylinder hit said flat wall portion of said hollow insert extending over part of said crown of said piston and are effectively cooled by said heat transmitting fluid arranged in said hollow insert of said piston.

5. An internal combustion engine, comprising, in combination: a cylinder having a substantially flat end wall, a pre-combustion chamber communicating with said cylinder through restricted opening in said flat end wall of said cylinder, a piston arranged in said cylinder for a reciprocating motion so as to be movable between a first end position and a second end position, said piston having a substantially flat crown arranged opposite to said flat end wall of said cylinder so as to define with said cylinder a combustion chamber having a volume changing between a maximum and a minimum substantially equal to zero when said piston reaches the first and second end positions thereof, respectively, a hollow insert arranged in said piston and having a flat wall portion extending over the same, said flat wall portion of said hollow insert being arranged opposite to said restricted opening in said flat end wall of said cylinder, and a heat transmitting fluid arranged in said hollow insert of said piston whereby fuel gases leaving said pre-combustion chamber through said restricted opening in said flat end wall of said cylinder hit said flat wall portion of said hollow insert extending over part of said crown of said piston and are effectively cooled by said heat transmitting fluid arranged in said hollow insert of said piston.

6. In an internal combustion engine as claimed in claim 2, wherein the hollow space in the piston head is at least partially filled with mercury.

7. In an internal combustion engine as claimed in claim 2, wherein the hollow space in the piston head is at least partially filled with sodium.

8. In an internal combustion engine as claimed in claim 2, a capsular insert arranged in said hollow piston space for receiving the fluid medium, and a cover completely shutting off said hollow piston space toward the outside.

9. In an internal combustion engine as claimed in claim 2, an insert detachably arranged in said hollow piston space, said insert receiving the fluid medium, and means for attaching said insert to said piston.

10. In an internal combustion engine as claimed in claim 2, said fluid medium consisting of a metal being solid at normal outside temperatures and liquid at the temperatures prevailing in said precombustion chamber at the operation of the internal combustion engine.

11. In an internal combustion engine as claimed in claim 3, a capsular insert in said hollow piston space for receiving the fluid medium, said insert being formed substantially as a hollow cylinder, and a plurality of ribs radially projecting from said hollow cylinder, said ribs increasing the heat transfer from said insert to said piston.

References Cited in the file of this patent

UNITED STATES PATENTS

| | | |
|---|---|---|
| 1,016,603 | Baker | Feb. 6, 1912 |
| 1,373,263 | Regenbogen | Mar. 29, 1921 |
| 1,669,093 | Krettingen | May 8, 1928 |
| 1,678,957 | Philipp | July 31, 1928 |
| 1,867,683 | Sperry | July 19, 1932 |
| 2,028,434 | Bernard | Jan. 21, 1936 |
| 2,089,749 | Jardine | Aug. 10, 1937 |
| 2,153,501 | Harper, Jr. | Apr. 4, 1939 |